US006362987B1

(12) United States Patent
Yurek et al.

(10) Patent No.: US 6,362,987 B1
(45) Date of Patent: Mar. 26, 2002

(54) WALL MOUNTED ELECTRICAL OUTLET RECEPTACLE FOR PROVIDING LOW VOLTAGE DC CURRENT

(76) Inventors: John Yurek, 17037 Chatsworth St. #204; Patrick McCabe, 17037 Chatsworth St., #206, both of Granada Hills, CA (US) 91344

(*) Notice: Subject to any disclaimer, the term of this patent is extended or adjusted under 35 U.S.C. 154(b) by 0 days.

(21) Appl. No.: 09/748,885

(22) Filed: Dec. 27, 2000

(51) Int. Cl.[7] .................................... H02M 1/00
(52) U.S. Cl. .................................... 363/146
(58) Field of Search .................................... 363/142, 143, 363/144, 146

(56) References Cited

U.S. PATENT DOCUMENTS

| | | | | |
|---|---|---|---|---|
| 3,458,794 A | | 7/1969 | Bohnstedt et al. | |
| 4,409,536 A | | 10/1983 | Evjen | |
| 4,647,831 A | | 3/1987 | O Malley et al. | |
| 5,256,953 A | | 10/1993 | Cimbal et al. | |
| 5,510,691 A | | 4/1996 | Palatov | |
| 5,587,645 A | | 12/1996 | Sciammarella et al. | |
| 5,656,914 A | | 8/1997 | Nagele et al. | |
| 5,744,934 A | | 4/1998 | Wu | |
| 5,834,919 A | | 11/1998 | Liu | |
| 5,847,545 A | | 12/1998 | Chen et al. | |
| 5,918,187 A | | 6/1999 | Weng | |
| 6,061,261 A | * | 5/2000 | Chen et al. | 363/146 |
| 6,127,803 A | | 10/2000 | Wang et al. | |
| 6,212,088 B1 | * | 4/2001 | Yoo | 363/146 |

* cited by examiner

*Primary Examiner*—Matthew Nguyen
(74) *Attorney, Agent, or Firm*—Sheldon & Mak; Denton L. Anderson

(57) ABSTRACT

An outlet receptacle has a base adapted to attach to the wall of a structure and an electrical element attached to the base. The electrical element includes a female receptacle capable of delivering low voltage DC current to a corresponding male insert, a step-down transformer and an AC/DC converter. The outlet receptacle is adapted to convert AC house current to low voltage DC current. The outlet receptacle is useful in recharging batteries used in portable electronic devices.

20 Claims, 2 Drawing Sheets

WALL MOUNTED ELECTRICAL OUTLET RECEPTACLE FOR PROVIDING LOW VOLTAGE DC CURRENT

BACKGROUND OF THE INVENTION

Battery operated electronic devices, such as cellular phones, lap top computers and electronic games, have become exceedingly popular. The problem with such products is the need for periodically recharging the batteries in such products. Heretofore, recharging the batteries of such products required the use of a separate battery recharging device which must be separately stored within the residence of the user and which must be separately packed and carried with the user when the user travels. Having to store and/or carry during traveling a separate battery charger can be quite awkward.

Accordingly, there is a need for a battery recharging device which avoids the aforementioned problem with the prior art.

SUMMARY

The invention satisfies this need. The invention is an outlet receptacle for providing low voltage DC current in the wall of a stationary structure where the structure has been wired to provide AC house current. The outlet receptacle comprises (a) a base adapted to attach to the wall of the structure, (b) a female receptacle capable of delivering low voltage DC current to a corresponding male insert, (c) a step-down transformer, (d) an AC/DC converter for converting AC current to DC current, the female receptacle, the transformer and the AC/DC converter being electrically connected to form an electrical unit capable of providing low voltage DC current at the female receptacle using the AC house current, the electrical unit being attached to the base, and (e) electrical connection means for connecting the electrical unit to a source of AC current at the wall of the structure.

DRAWINGS

These features, aspects and advantages of the present invention will become better understood with regard to the following description, appended claims and accompanying figures where:

DETAILED DESCRIPTION

Figure 1:
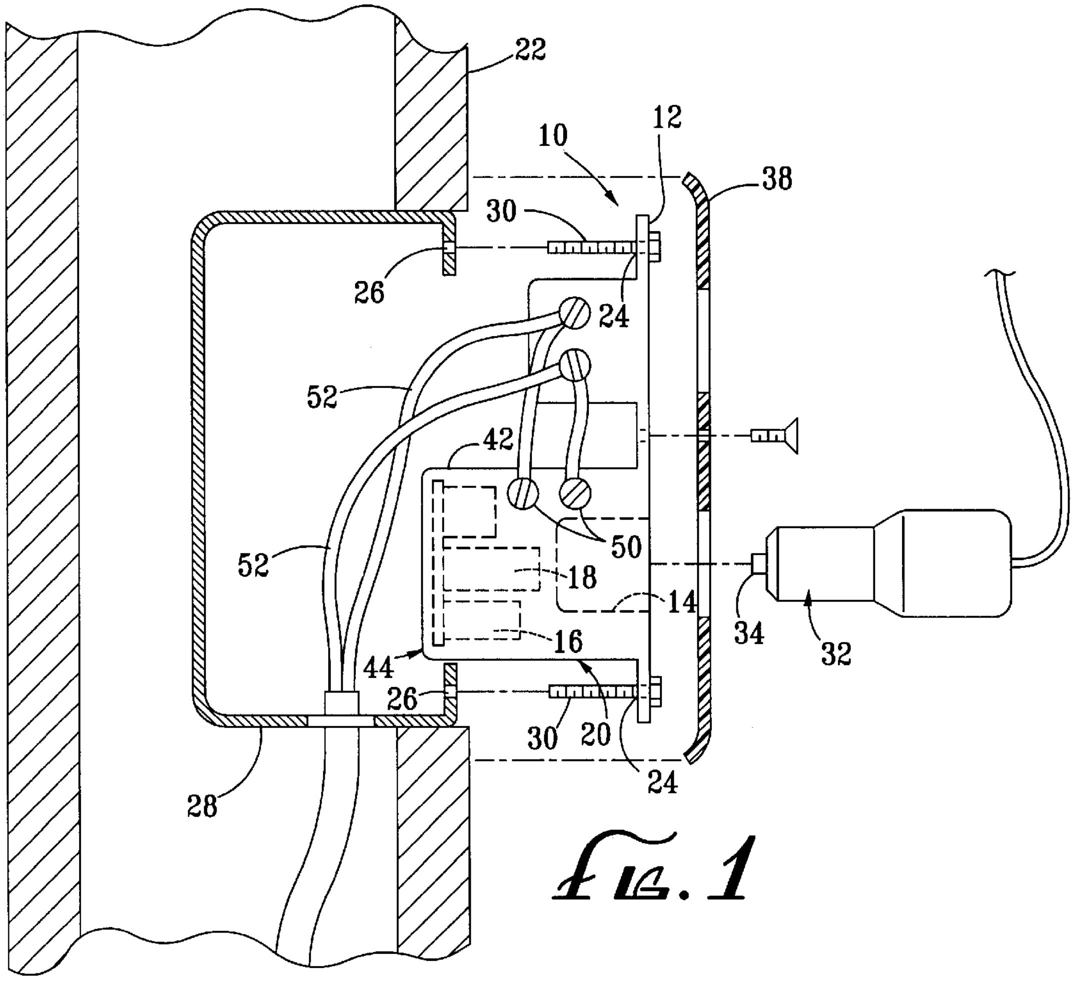
FIG. 1 is a cross-sectional exploded side view illustrating an outlet receptacle having features of the invention.

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is an outlet receptacle 10 for providing low voltage DC current.

The outlet receptacle 10 comprises a base 12, a female receptacle 14, a step-down transformer 16, and an AC/DC converter 18. The female receptacle 14, the transformer 16 and the AC/DC converter 18 are electrically connected to form an operative electrical unit 20 capable of providing low voltage DC current at the female receptacle 14 using higher voltage AC house current.

The base 12 is typically a sculpted plate adapted to attach to the wall 22 of a residential or commercial structure. In a typical embodiment, the base 12 comprises a pair of apertures 24, spaced apart from one another to align with corresponding apertures 26 in standard size electrical junction boxes 28 of the type typically used to facilitate electrical connections in residential and commercial structures. By this design, the base 12 is conveniently attached to a junction box 28 within the wall 22 of the structure using a pair of screws 30. The base 12 is typically made from a metal, although other materials such as plastics and woods can also be used.

The female receptacle 14 is capable of delivering low voltage DC current to a corresponding male insert 32. In a typical embodiment, the female receptacle 14 is an automobile cigarette lighter-shaped female receptacle sized and dimensioned to accept an automobile cigarette lighter-type male insert. The female receptacle 14, however, can be sized and dimensioned to accept any size or shape of male insert 32. The female receptacle 14 comprises electrical contacts (not shown) disposed within the female receptacle 14 for contacting corresponding electrical contacts 34 on the male insert 32. One female receptacle 14 known to be useable in the invention is a panel mount female connector 12 V automotive cigarette plug.

The step-down transformer 16 can be any of the many kinds of step-down transformers known in the art capable of taking a high voltage AC house current and reducing it to a low voltage current. In a typical embodiment, the AC house current has an electrical potential of about 110 volts, that is, an electrical potential between about 100 volts and about 120 volts. The step-down transformer 16, however, can be chosen to reduce house currents of much higher voltage or a much lower voltage. One step-down transformer 16 known to be useable in the invention is a Hammond 166F12 110 volt AC/12.6VCT.

In a typical embodiment, the low voltage DC current available at the electrical contacts 33 within the female receptacle 14 is about 12 volts, that is, between about 5 volts and about 20 volts. An infinite range of other voltages can also be provided by choosing different step-down transformers 16. In one embodiment of the invention, illustrated in FIG. 3, the step-down transformer 16 is of a variable type, wherein the low voltage DC current available at the female receptacle 14 is adjustable, such as by a dial 36 disposed on the outside of a cover plate 38.

Figure 8:
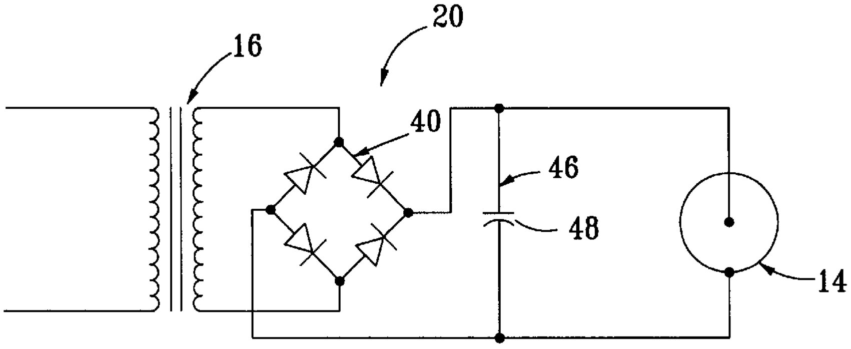
FIG. 8 is an electrical diagram illustrating the electrical components of an embodiment having features of the invention.

The AC/DC converter 18 can be any of the many AC/DC converters known in the art. In one embodiment, as shown in FIG. 8, the AC/DC converter 18 is a full bridge rectifier 40. In other embodiments, the AC/DC converter 18 can comprise one or more switches, such as diode switches, which serve to allow current flow in only one direction. One AC/DC converter 18 known to be useable in the invention is a General Semiconductor DF00FM bridge rectifier.

Typically, the step-down transformer 16 and the AC/DC converter 18 are combined into a single housing 42 to form a single transformer/converter element 44.

As also illustrated in FIG. 8, the electrical unit 20 can further comprise a filter 46 for filtering out AC "ripple." In the embodiment illustrated in FIG. 8, the filter 46 is provided by an electrolytic capacitor 48. One filter known to be useable in the invention is a United Chemicon LXF16VB22M12X30L (2200 $\mu$F 16V) cup.

The electrical unit 20 can also comprise a resistor (not shown) to limit and control current.

The various components of the electrical unit 20 are electrically connected to form the electrical unit 20 by wires or other types of electrical connections. Electrical connection means, such as a pair of connection wires 50, are provided for connecting the electrical unit 20 to a source of AC current via terminated wire connections 52 at the wall 22 of the structure.

The electrical unit 20 is attached to the base 12, so that the electrical unit 20 can be easily attached into the wall 22 of the structure.

In a typical embodiment, the outlet receptacle 10 is covered by a cover plate 38 as illustrated in FIGS. 1–5.

Figure 2:
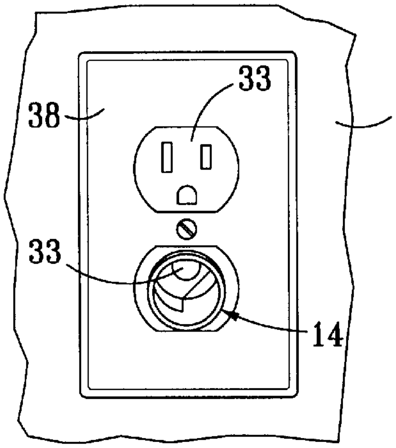
FIG. 2 is a front view of the outlet receptacle illustrated in FIG. 1.

FIGS. 1 and 2 illustrate a typical embodiment wherein the outlet receptacle 10 further comprises a standard three-prong, 110 volt AC outlet 54 attached to the base 12.

Figure 3:
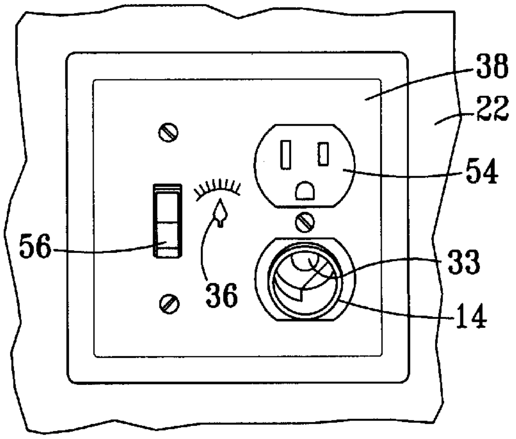
FIG. 3 is a front view of a second embodiment of an outlet receptacle having features of the invention.

FIG. 3 illustrates another embodiment of the invention wherein the cover plate is sized and dimensioned to also cover a standard electrical switch 56.

Figure 4:
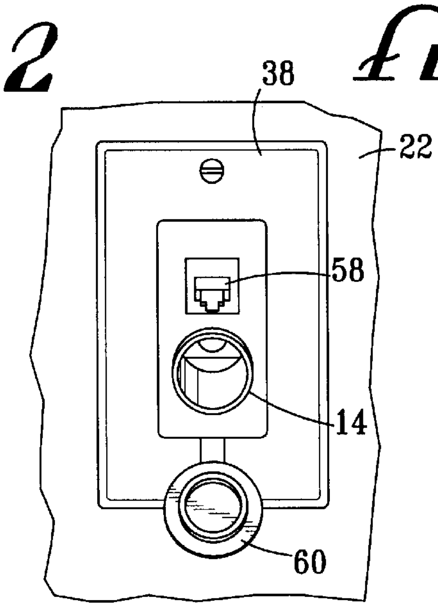
FIG. 4 is a front view of a third embodiment of an outlet receptacle having features of the invention.
Figure 5:
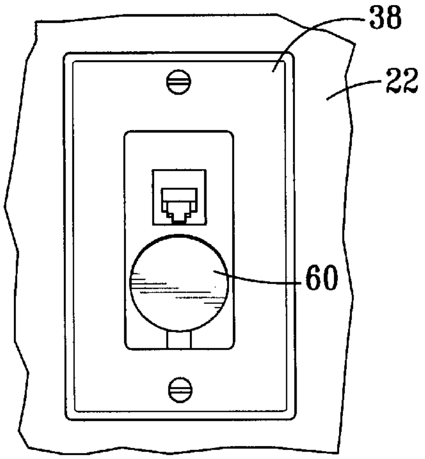
FIG. 5 illustrates the outlet receptacle shown in FIG. 4 with an outlet receptacle cover covering the outlet receptacle.

FIG. 4 illustrates an embodiment of the invention wherein the cover plate 38 further comprises a telephone or data jack port 58 attached to the base 12. FIGS. 4 and 5 also illustrate the use of an optional cover flap 60 for covering the opening in the female receptacle 14 when the female receptacle 14 is not in use. Such cover flap 60 is typically made from a pliable plastic or rubber and is sized and dimensioned to press-fit into the opening of the female receptacle 14.

Figure 6:
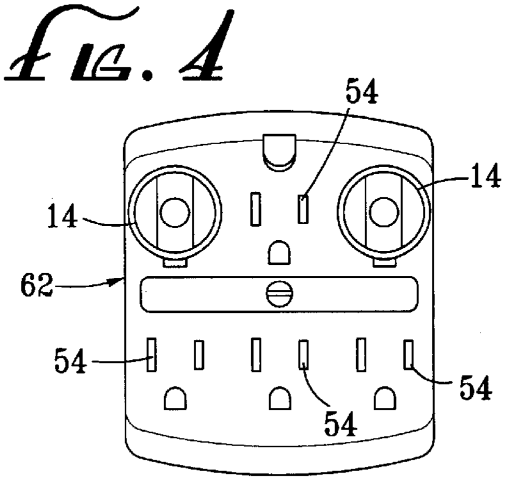
FIG. 6 is a front view of a fourth embodiment of an outlet receptacle having features of the invention.
Figure 7:
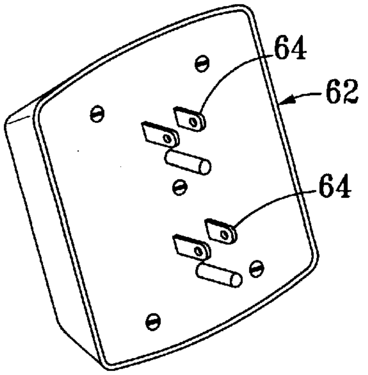
FIG. 7 is an isometric view of the rear side of the embodiment illustrated in FIG. 6.

FIGS. 6 and 7 illustrate another embodiment of the invention. In this embodiment, the electrical unit 20 is disposed within a separate electrical outlet box 62. At the rear of the electrical outlet box 62, one or more sets of 110 volt AC electrical connection prongs 64 extend rearwardly to allow the electrical unit 20 to be electrically connected to AC current at a standard AC house current receptacle. In the embodiment illustrated in FIGS. 6 and 7, the front wall of the electrical outlet box 62 further comprises one or more standard AC electrical connection receptacles 54.

The invention, when installed in the residence of a user, allows the user to conveniently recharge his or her rechargeable batteries without having to store and unstore a separate recharging device. Moreover, when the invention is installed in hotels to which the user travels, the user does not have to pack and carry with him or her a separate recharging device.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. An outlet receptacle for providing low voltage DC current in the wall of a stationary structure, the structure being wired to provide AC house current, the outlet receptacle comprising:

(a) a base adapted to attach to the wall of the structure;

(b) a female receptacle capable of delivering low voltage DC current to a corresponding male insert;

(c) a step-down transformer;

(d) an AC/DC converter for converting AC current to DC current, the female receptacle, the transformer and the AC/DC converter being electrically connected to form an electrical unit capable of providing low voltage DC current at the female receptacle using the AC house current, the electrical unit being attached to the base; and (e) electrical connection means for connecting the electrical unit to a source of AC current at the wall of the structure.

2. The outlet receptacle of claim 1 wherein the wall of the structure comprises a junction box into which AC house current is provided and wherein the base is adapted to attach to the junction box.

3. The outlet receptacle of claim 1 further comprising a standard AC outlet attached to the base.

4. The outlet receptacle of claim 1 wherein the AC house current has an electrical potential of about 110 volts.

5. The outlet receptacle of claim 1 wherein the low voltage DC current has a potential of about 12 volts.

6. The outlet receptacle of claim 1 wherein the step-down transformer and the AC/DC converter are combined into a single transformer/converter element.

7. The outlet receptacle of claim 1 wherein the electrical unit further comprises a DC voltage adjustor for adjusting the potential of the DC current at the female receptacle.

8. The outlet receptacle of claim 7 wherein the electrical unit is covered by a wall plate and wherein the DC voltage adjustor comprises an adjustment switch disposed on the exterior side of the wall plate.

9. The outlet receptacle of claim 1 wherein the female receptacle is a cigarette lighter type receptacle and the corresponding male insert is a cigarette lighter type male insert.

10. An outlet receptacle for providing low voltage DC current at a junction box disposed in the wall of a stationary structure, the structure being wired to provide AC house current, the outlet receptacle comprising:

(a) a base adapted to attach to the junction box;

(b) a female receptacle capable of delivering low voltage DC current to a corresponding male insert;

(c) a combination step-down transformer/converter element capable of converting 110 volt AC current to 12 volt DC current, the female receptacle, and the combination step-down transformer/converter element being electrically connected to form an electrical unit capable of providing low voltage DC current at the female receptacle using the AC house current, the electrical unit being attached to the base; and (d) electrical connection means for connecting the unit to a source of AC house current at the junction box.

11. The outlet receptacle of claim 10 wherein the low voltage DC current has a potential of about 12 volts.

12. The outlet receptacle of claim 10 wherein the electrical unit further comprises a DC voltage adjustor for adjusting the potential of the DC current at the female receptacle.

13. The outlet receptacle of claim 12 wherein the electrical unit is covered by a wall plate and wherein the DC voltage adjustor comprises an adjustment switch disposed on the exterior side of the wall plate.

14. An outlet receptacle for providing low voltage DC current at a junction box disposed in the wall of a stationary structure, the structure being wired to provide AC house current at a potential of about 110 volts, the outlet receptacle comprising:

(a) a base adapted to attach to the junction box;

(b) a female receptacle capable of delivering low voltage DC current at a potential of about 12volts to a corresponding male insert;

(c) a combination step-down transformer/converter element capable of converting 110 volt AC current to 12 volt DC current, the female receptacle, and the combination step-down transformer/converter element being electrically connected to form an electrical unit capable of providing low voltage DC current at the female receptacle using the AC house current, the electrical unit being attached to the base; and (d) electrical connection means for connecting the unit to a source of AC house current at the junction box.

15. The outlet receptacle of claim 14 further comprising a standard prong AC outlet attached to the base.

16. The outlet receptacle of claim 14 wherein the electrical unit further comprises a DC voltage adjustor for adjusting the potential of the DC current at the female receptacle.

17. The outlet receptacle of claim 16 wherein the electrical unit is covered by a wall plate and wherein the DC voltage adjustor comprises an adjustment switch disposed on the exterior side of the wall plate.

18. The outlet receptacle of claim 14 wherein the female receptacle is a cigarette lighter type receptacle and the corresponding male insert is a cigarette lighter type male insert.

19. A plug in adaptor for providing low voltage DC current from an AC current outlet, the adaptor comprising:

(a) an electrical outlet box;

(b) a female receptacle having a receptacle opening in the electrical outlet box, the female receptacle being capable of delivering low voltage DC current to a corresponding male insert;

(c) a step-down transformer disposed within the electrical outlet box;

(d) an AC/DC converter for converting AC current to DC current disposed within the electrical outlet box, the female receptacle, the transformer and the AC/DC converter being electrically connected to provide an electrical unit capable of providing low voltage DC current at the female receptacle using AC current;

(e) a standard AC current male connector projecting away from the cover box; and (f) electrical connection means for connecting the AC current male connector to the electrical unit.

20. The plug in adaptor of claim 19 further comprising at least one AC current female receptacle disposed within the cover box.

* * * * *